Nov. 4, 1969 R. C. HOWARD ET AL 3,476,482
OPACIMETER FOR COMPARING LIGHT FROM DIFFERENT
AREAS OF SAMPLE SHEET
Filed Sept. 27, 1967
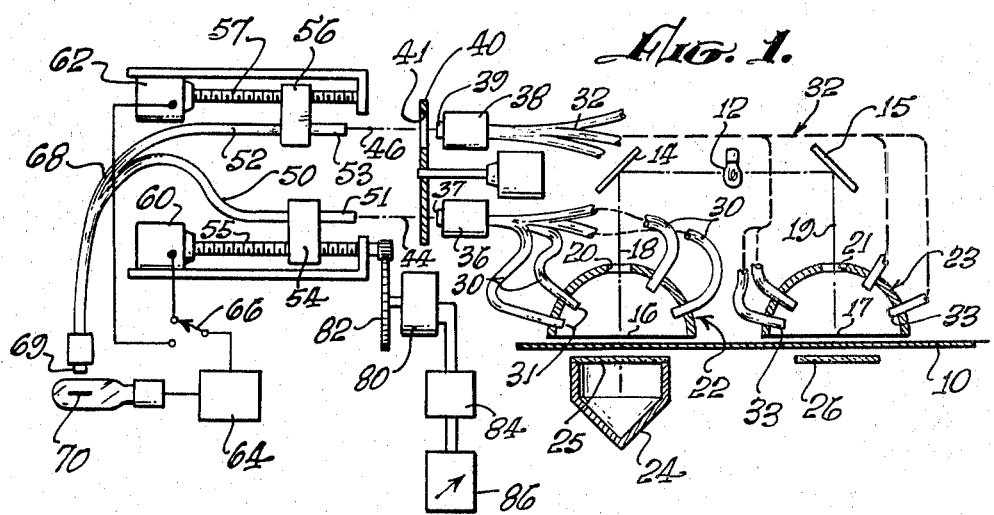
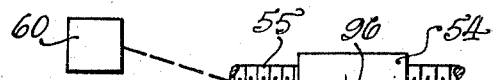
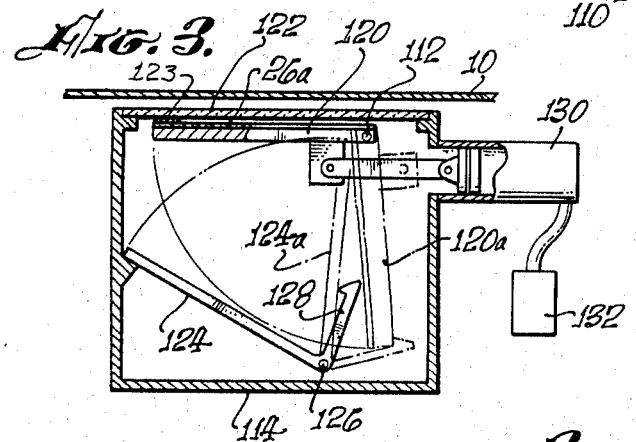
INVENTORS.
Robert C. Howard,
Dale C. Baker,
By Charlton M. Lewis

United States Patent Office 3,476,482
Patented Nov. 4, 1969

3,476,482
OPACIMETER FOR COMPARING LIGHT FROM DIFFERENT AREAS OF SAMPLE SHEET
Robert C. Howard, Monrovia, and Dale C. Baker, Pasadena, Calif., assignors to Conrac Corporation, New York, N.Y., a corporation of New York
Filed Sept. 27, 1967, Ser. No. 671,031
Int. Cl. G01n 21/30
U.S. Cl. 356—199                    5 Claims

ABSTRACT OF THE DISCLOSURE

Diffuse light from a surface is integrated by sampling it at selected angles in respective bundles of optical fibers. The samples are effectively integrated by intermingling the delivery ends of the fibers essentially randomly to form a unitary fiber bundle.

Two beams to be compared are received in respective fiber bundles that are movable by servo drive along the respective beam axes to attenuate the received light. Fibers of the bundles are intermingled at their delivery ends for illuminating a sensor.

An opacimeter is calibrated by shifting a backing surface between "white" and "black" conditions and nulling the system by attenuation of one beam, the other beam being attenuated for readout.

---

This invention has to do generally with the measurement of optical properties of materials, and with optical devices that are useful for such measurements and for similar purposes.

The invention is particularly useful for measuring the opacity of sheet materials such as paper, and will be described illustratively as it relates to measuring the opacity of paper.

The "opacity" is a useful measure of the relationship between the diffuse reflection of light from the paper surface and its transmission through the sheet, and is defined within the paper industry as the ratio, expressed as a percent, of the diffuse reflectance of the paper when backed by a light absorbing surface to its reflectance when backed by a light reflecting surface, as measured with an optical system and with backing surfaces that conform to specified standards. The present invention is particularly useful in connection with the methods and instruments for measuring opacity that are described and claimed in the copending patent application, Ser. No. 388,140, filed Aug. 7, 1964 by Robert C. Howard, one of the present applicants.

Diffuse reflectance of a surface is typically measured by directing a light beam toward a limited area of the surface and effectively integrating the light that is reflected from that area in all directions. In practice it is sufficient to sample the light reflected in a plurality of specific directions, selected to be properly representative of all directions, and to combine the samples into a single light beam. Such sampling can be accomplished conveniently by means of "light pipes" composed of bundles of optical fibers, as described more fully in the above identified copending application. One aspect of the present invention provides improved means for combining the light that is transmitted in a number of such fiber bundles, by intermingling their individual fibers in an essentially random manner.

A further aspect of the present invention provides improved means for comparing the integrated light reflected from a first surface area backed by a "white" surface and the integrated light from a second surface area backed by a "black" surface. The integrated light beams from those two surfaces are alternately intercepted by a shutter mechanism, and the resulting chopped beams are received by respective bundles of optical fibers. The delivery ends of the fibers of those two bundles are intermingled in the manner just described, so that both bundles deliver light along a common optical axis and with essentially identical light distribution with respect to the axis. The resulting integrated beam can then be received by a light sensing element of any suitable type, for example a photomultiplier tube, with good efficiency and with confidence that the sensing element will respond similarly to light delivered by the respective fiber bundles. Any inequality of the light intensity received by those two bundles causes the output signal from the light sensor to contain an alternating current component of frequency corresponding to the shutter frequency. That component is readily amplified, and may be employed as a servo error signal to controllably attenuate the input to one of the two bundles to maintain equality.

A further aspect of the present invention provides controlled attenuation of the light intensity in one or other of the described chopped light beams by shifting the input end of the bundle of light pipes bodily along its optical axis relative to the light source to which it is responsive. That procedure is somewhat similar to the method described in connection with FIG. 16 of the above identified copending application, but has the advantage of greatly increased mechanical and optical simplicity.

A further aspect of the present invention provides improved means for calibrating an opacimeter of the present general type, in which distinct areas of the sheet are backed by "white" and by "black" surfaces. The backing structures are arranged to permit shifting them to a calibrating condition in which both areas are backed by equal reflectances. With the backing surfaces in calibrating condition, the servo system is nulled by driving a light attenuating device in one light path. After restoring the backing susfaces to operating condition, one "black" and the other "white," the system is nulled by variably attenuating light in the other light path, with readout in terms of opacity. In preferred form, the light from the black-backed surface is varied for readout, and that from the normally white-backed area is varied for calibration after being shifted to black-backed condition. Before calibration the normally black-backed light beam is set to a standard condition of attenuation.

A full understanding of the invention will be had from the following description of certain illustrative manners in which it may be carried out, of which description the accompanying drawings form a part.

In the drawings:
FIG. 1 is a schematic drawing, partly in section, representing an illustrative system in accordance with certain aspects of the invention.
FIG. 2 is a schematic fragmentary drawing at enlarged scale, representing a modification; and
FIG. 3 is a schematic section at enlarged scale, representing a further aspect of the invention.

FIG. 1 shows schematically a sheet of paper or like material at 10, supported by means not explicitly shown in a predetermined plane. Sheet 10 may comprise a paper web between two rollers, and may move longitudinally either continuously or intermittently without affecting operation of the measuring system to be described. A light source is shown at 12 with mirrors 14 and 15 for directing light from source 12 toward respective mutually spaced areas 16 and 17 of sheet 10. Those areas are of equal size, determined by suitable diaphragm systems on the respective axes 18 and 19. Such diaphragms are indicated as the apertures 20 and 21 in the semicylindrical enclosures 22 and 23. Area 16 of sheet 10 is backed by the window 25 and the light trap structure 24, which acts optically as an essentially black surface. Area 17 is backed by the mirror indicated at 26, which acts as a white surface.

Enclosures 22 and 23 support the light receiving or input ends of respective arrays of light pipes, which receive light from the areas 16 and 17 at definite selected angles. As illustratively shown, four light pipes 30 are shown with their input ends 31 directed at area 16; and four light pipes are indicated at 32 with their input ends similarly directed toward area 17. Each of those light pipes is typically a bundle of optical fibers of the same general type described in the above identified copending application. The light emitting or delivery ends of the fiber bundles, however, are brought together in the present embodiment at the fittings 36 and 38 in such a way that they form essentially unitary bundles 37 and 39, respectively, in which the individual fibers from each of the initial bundles are essentially uniformly distributed. That may be accomplished by peeling back the covering of each of the fiber bundles 30, for example, for several inches from their delivery ends and then interminigling the individual fibers from the respective bundles until the fibers from each bundle are distributed essentially randomly throughout the collection of all fibers. That method of assembling the fibers at their delivery ends has the great davantage that the various light samples received by the respective bundles are more effectively integrated. Each unit area of the delivery end of the integrated bundle 37, for example, contains approximately equal numbers of fibers from each of the bundles 30, and the light emitted by each unit area therefore includes approximately equivalent contributions from all the samples initially obtained of the light from area 16 of sheet 10.

In the system of FIG. 1, the light beams emitted from the two integrated fiber bundles 37 and 39 are chopped alternately by the revolving shutter 40, driven by the motor 43. In practice a plurality of apertures such as 41 may be employed to give a higher frequency of chopping. The chopped light on optical axes 44 and 46 is received by the respective light pipes 50 and 52. The receiving end portions of those pipes are mounted on the respective carriages 54 and 56, which are suitably guided by means not shown, and are driven by the lead screws 55 and 57 in a manner to move the input ends 51 and 53 along the respective optical axes 46 and 48. Such movement varies the intensity of light entering the light pipes, approximately in inverse relation to the square of the distance from pipe ends 51 and 53 to the respective effective light sources at 37 and 39. The lead screws are driven by the respective electric motors 60 and 62 under control of the output signal from the servo amplifier 64. The amplifier output is switchable by means of the switch 66 to control selectively either one of the motors 60 and 62, motor 60 being driven in the present embodiment for readout, motor 62 for calibration of the system.

The two light pipes 50 and 52 have their optical fibers intermingled essentially randomly, as indicated at 68, to form a unitary fiber bundle with delivery end at 69 in the manner already described. Light emitted from 69 is received by the light responsive device 70, which may be the sensitive surface of a photomultiplier tube, for example. The output from device 70 is supplied as error signal to servo amplifier 64. If the light intensities in light pipes 50 and 52 are unequal, the signal entering amplifier 64 will contain an alternating current component having a definite phase relation to the chopping action of shutter 40. The signal is demodulated by amplifier 64 under control of a phase reference signal which may be developed in conventional manner, and a suitable output signal is supplied to switch 66 for driving either motor 60 or motor 62 in the proper direction to make the two light intensities equal. When null has been obtained, assuming proper calibration of the system, the position of carriage 54 represents uniquely the value of the opacity of the sheet material at 10.

Readout of that opacity value may be provided in many different ways. As illustrated in FIG. 1, a potentiometer 80 is coupled to the shaft of leadscrew 55 via suitable gearing 82. The output signal from the potentiometer is processed by circuitry indicated schematically at 84, including correction for the non-linearity that results from the inverse square law dependence of the described optical attenuation mechanism. The output signal from 84 is then typically directly proportional to opacity, and is displayed or otherwise utilized by a suitable utilization device 86.

The accuracy of the servo action is greatly improved by the described intermingling of the optical fibers of the two bundles 50 and 52 before emission of light from their delivery ends at 69. The substantially random arrangement of the fibers insures effectively uniform response of sensor 70 to light from the two bundles, not only eliminating any fixed bias in favor of one or the other, which might be corrected by calibration, but also eliminating variations due to small changes of position of the parts, irregularities of illumination of the input ends of the respective bundles, and the like. The remarkably high accuracy and reproducibility that have been obtained in practice are believed due in appreciable measure to elimination of such sources of systematic errors. A particular advantage of the technique just described is that it does not entail any reduction of intensity at sensor 70, such as would result from conventional diffusion techniques for rendering light beams more uniform.

FIG. 2 illustrates schematically a modified readout mechanism which inserts the proper output function mechanically rather than electrically. The rack 90 is mounted on carriage 54 and engages the gear 92 which is mounted on the shaft 93 of potentiometer 80a. The potentiometer case and winding are mounted on the sleeve 94, which coaxially surrounds shaft 93 and is journaled on the support post indicated at 95. Sleeve 94 also carries the radial arm 96 which acts as a crank arm for driving the rotary movement of the potentiometer winding. Arm 96 is driven by the linkage mechanism 100, which comprises the three links 101, 102 and 103 which are pivotally connected at one end on the common free pivot axis 104. The other end of link 101 is pivoted on the end of arm 96. The other end of link 102 is pivoted on a bracket 105 mounted on carriage 54. The other end of the third link 103 is pivoted on a bracket 106, which is rigidly but adjustably mounted on the instrument frame. As carriage 54 moves to the right from the position shown in FIG. 2, links 101 and 102 become more nearly parallel, causing arm 96 to swing clockwise. After passing through parallel relation, the links become again oblique, drawing arm 96 back in a counterclockwise direction. It has been found that by adjusting bracket 106 both vertically and horizontally, as indicated by the slotted holes at 110, a very wide variety of detailed movements of the potentiometer case are obtainable, permitting production of correspondingly varied functional relationships between the carriage movement and the potentiometer output. With suitable selection of that function, the potentiometer output may be made linearly proportional to opacity within a very close tolerance.

FIG. 3 represents schematically a preferred mechanism for shifting the mirror 26 of FIG. 1 between the operative position shown in that figure and an inoperative position in which sheet 10 is effectively backed by a black surface. As shown in FIG. 3, the mirror 26a is mounted on a flat mirror support 120 which is pivotallly mounted at 112 within the protective sheet metal case 114 for swinging movement between the operating position shown in solid lines and the retracted position shown in dashed lines 120a. A thin protective window 122 forms the top wall of case 114, and mirror 26a when in operating position is closely spaced below the window by the resilient pad 123. The mirror movement is driven typically by the air cylinder indicated at 130 in response to control air selectively supplied from 132. The flat mirror cover 124 is pivotally mounted at 126 for swinging movement between the normal position shown in solid lines and the shifted position shown in dashed lines at 124a. Mirror cover 124 carries the actuating arm 128. When mirror 120 is swung to its retracted position 120a, its end portion strikes arm 128 and causes the mirror cover to swing clockwise as seen in FIG. 3 to its shifted position 124a. In the latter position the mirror cover effectively covers the reflective surface of mirror 26a. The entire interior of case 114, including mirror cover 124, is blackened. Hence, when the mirror is retracted and covered, light entering the case through window 122 is effectively completely absorbed. Sheet 10 is therefore effectively backed by a black surface. Under that condition the two regions of sheet 10 shown at 16 and 17 of FIG. 1 both appear equally bright from above, so that the light intensities reaching integrated fiber bundles 37 and 39 are normally accurately matched.

To calibrate the described system, air source 132 is actuated to retract mirror 26a, equalizing the two light paths. Carriage 54 is set at a standard position, typically that corresponding to unity value of the opacity as indicated at 86, for example. Switch 66 is operated to connect amplifier 64 to calibrating motor 62. The servo system then automatically drives carriage 56 to null position, compensating any inequality that may be present between the two optical paths at any point between their complete lengths from their common source 12 to the unitary light output at 69 to sensor 70. With the carriage 56 in that null position, mirror 26a is returned to operating position and switch 66 is shifted to connect amplifier 64 to readout motor 60. The servo system then drives readout carriage 54 to null, producing at 86 a continuous indication of the opacity of sheet 10. The described calibration can be repeated at any time without interfering with continuous movement of sheet 10 if the instrument is used "on line" in a paper mill, for example.

The described embodiments of the invention are intended only as illustration and not as a limitation upon the scope of the invention, which is defined in the appended claims.

We claim:
1. In a system responsive to the opacity of a sheet, the combination of
   means for illuminating two spaced areas of the sheet,
   means for separately integrating light from the respective illuminated areas to form two light beams,
   means for comparing the light beams and developing an error signal representing any difference between the light intensities therein,
   means normally forming an effectively black backing for the sheet at one of the areas,
   means normally forming an effectively white backing for the sheet at the other area,
   means for shifting one of the last said means from normal condition to change its backing effectively between white and black,
   means drivable under control of the error signal when said one means is in shifted condition to vary the intensity of one of the light beams in a direction to reduce said difference for calibrating the system,
   means drivable under control of the error signal when said one means is in normal condition to vary the intensity of the other light beam in a direction to reduce said difference,
   and output means responsive to the last said drivable means for representing the opacity of said sheet.

2. The combination defined in claim 1, and in which said light integrating means for each of the illuminated areas comprises
   a plurality of bundles of optical fibers having respective radiation receiving ends and radiation delivery ends,
   structure mounting the bundles with their radiation receiving ends in spaced relation to the illuminated area for receving radiation therefrom in respective different directions,
   structure mounting the fibers of all the bundles adjacent their radiation delivery ends with the fibers of the respective bundles mutually intermingled to form an essentially unitary array, the radiation emitted from the array forming an integrated light beam.

3. The combination defined in claim 2, and in which in the fibers of all bundles for each illuminated area are essentially randomly intermingled in said array.

4. The combination defined in claim 1, and in which said means for comparing the light beams and developing an error signal comprise
   two bundles of optical fibers having their radiation receiving ends in the paths of the respective light beams,
   shutter means for alternately intercepting the beams to cause the fiber bundles to be intermittently and alternately illuminated,
   structure mounting the optical fibers adjacent their opposite ends with the fibers of the respective bundles mutually intermingled to form an essentially unitary array,
   and radiation responsive means in the path of radiation emitted from said fiber array, said radiation responsive means being essentially equally responsive to radiation derived from the respective fiber bundles and develiping an error signal representing any difference between the light intensities therein.

5. The combination defined in claim 4, and in which the radiation intensity in said light beams adjacent the radiation receiving ends of the fiber bundles varies longitudinally of the beams,
   and said drivable means comprise means for shifting the radiation receiving ends of the respective fiber bundles longitudinally of their light beams.

References Cited

UNITED STATES PATENTS 2,471,750    5/1949    Hunter.
3,244,894    4/1966    Steele et al.

ROBERT SEGAL, Primary Examiner

U.S. Cl. X.R.
250—219, 227